United States Patent [19]
Hirose et al.

[11] Patent Number: 5,513,609
[45] Date of Patent: May 7, 1996

[54] FUEL INJECTION SYSTEM

[75] Inventors: Katsuhiko Hirose, Susono; Shinji Kamoshita, Gotenba, both of Japan

[73] Assignee: Toyota Jidosha Kabushiki Kaisha, Toyota, Japan

[21] Appl. No.: 291,227

[22] Filed: Aug. 16, 1994

[30]  Foreign Application Priority Data

Aug. 19, 1993 [JP] Japan ................... 5-205180

[51] Int. Cl.⁶ ................................................. F02M 3/00
[52] U.S. Cl. ............................................... 123/339.14
[58] Field of Search ............... 123/339.14; 364/424.03

[56]  References Cited

U.S. PATENT DOCUMENTS

| | | | |
|---|---|---|---|
| 4,982,709 | 1/1991 | Oota | 123/339.14 |
| 5,040,117 | 8/1991 | Shyu et al. | 364/424.03 |
| 5,228,421 | 7/1993 | Orzel | 123/339.14 |
| 5,229,946 | 7/1993 | Ghaem | 364/431 |
| 5,345,908 | 9/1994 | Nishimura et al. | 123/339.14 |

FOREIGN PATENT DOCUMENTS

| | | | |
|---|---|---|---|
| 60-198356 | 10/1985 | Japan | 123/339 |
| 62-291453 | 12/1987 | Japan | 123/339 |
| 264250 | 3/1990 | Japan | 123/339 |

Primary Examiner—Raymond A. Nelli
Attorney, Agent, or Firm—Kenyon & Kenyon

[57]  ABSTRACT

A fuel injection system with a fuel injection pump. The system comprises first correction means for correcting a first basic volume of fuel fed by the fuel injection pump using a correction value calculated so as to realize a predetermined constant engine speed during at least one predetermined engine operating condition, calculation mean for calculating the variation of the correction value corresponding to the fuel temperature at predetermined engine load in the predetermined engine operating condition, and determining means for determining at least one property of current fuel on the basis of the variation. Accordingly, the system can automatically detect the properties of a fuel while driving.

12 Claims, 5 Drawing Sheets

FUEL INJECTION SYSTEM

BACKGROUND OF THE INVENTION

1. Field of the Invention

The present invention relates to a fuel injection system with a fuel injection pump for an internal combustion engine.

2. Description of the Related Art

In a diesel engine, pressure within the engine cylinder becomes very high at fuel injection time, so that a usual fuel injection system has a fuel injection pump for injecting fuel under pressure into the engine cylinder. The fuel injection pump is usually a positive displacement type and varies the volume of the fuel injected, according to the current engine operating conditions. However, to realize a desired engine operating condition, the required weight of fuel must be injected into the engine cylinder, so that when the density or the bulk modulus of the fuel changes, a desired engine operating condition can not be realized by the above fuel injection system.

The density and the bulk modulus of fuel change corresponding to fuel temperature. Accordingly, in the usual fuel injection system, the volume of fuel injected is corrected corresponding to the fuel temperature. However, fuels sold in a market do not always have the same properties. If fuel resupplied has properties which are largely different from standard properties, it is necessary to detect the properties of the fuel, for example the density or the bulk modulus corresponding to fuel temperature, which affect the weight of fuel injected and to correct the volume of fuel injected according to the new properties.

For this purpose, Japanese Unexamined Patent Publication No. 2-64250 discloses a fuel injection system having correcting means for correcting the volume of the injected fuel, according to fuel properties imputted thereinto.

The above fuel injection system also needs an analyzing device for analyzing the fuel properties. Such an analyzing device is usually large and very expensive. Accordingly, it is very difficult to mount it in a vehicle and thus it is necessary for a driver to analyze the fuel properties at every refueling by using the analyzing device which is installed in a certain place, so that the above fuel injection system is not practical.

SUMMARY OF THE INVENTION

Therefore, an object of the present invention is to provide a fuel injection system with a fuel injection pump, capable of detecting automatically the properties of fuel resupplied, which affect the weight of fuel injected while driving.

According to the present invention there is provided a fuel injection system with a fuel injection pump comprising: first correction means for correcting a first basic volume of fuel fed by the fuel injection pump by using a correction value calculated so as to realize a predetermined constant engine speed during at least one predetermined engine operating condition; calculation means for calculating a variation in the correction value corresponding to the fuel temperature at a predetermined engine load in the predetermined engine operating condition; and determining means for determining at least one property of the current fuel on the basis of the variation.

The present invention will be more fully understood from the description of preferred embodiments of the invention set forth below, together with the accompanying drawings.

DESCRIPTION OF THE PREFERRED EMBODIMENTS

Figure 1:
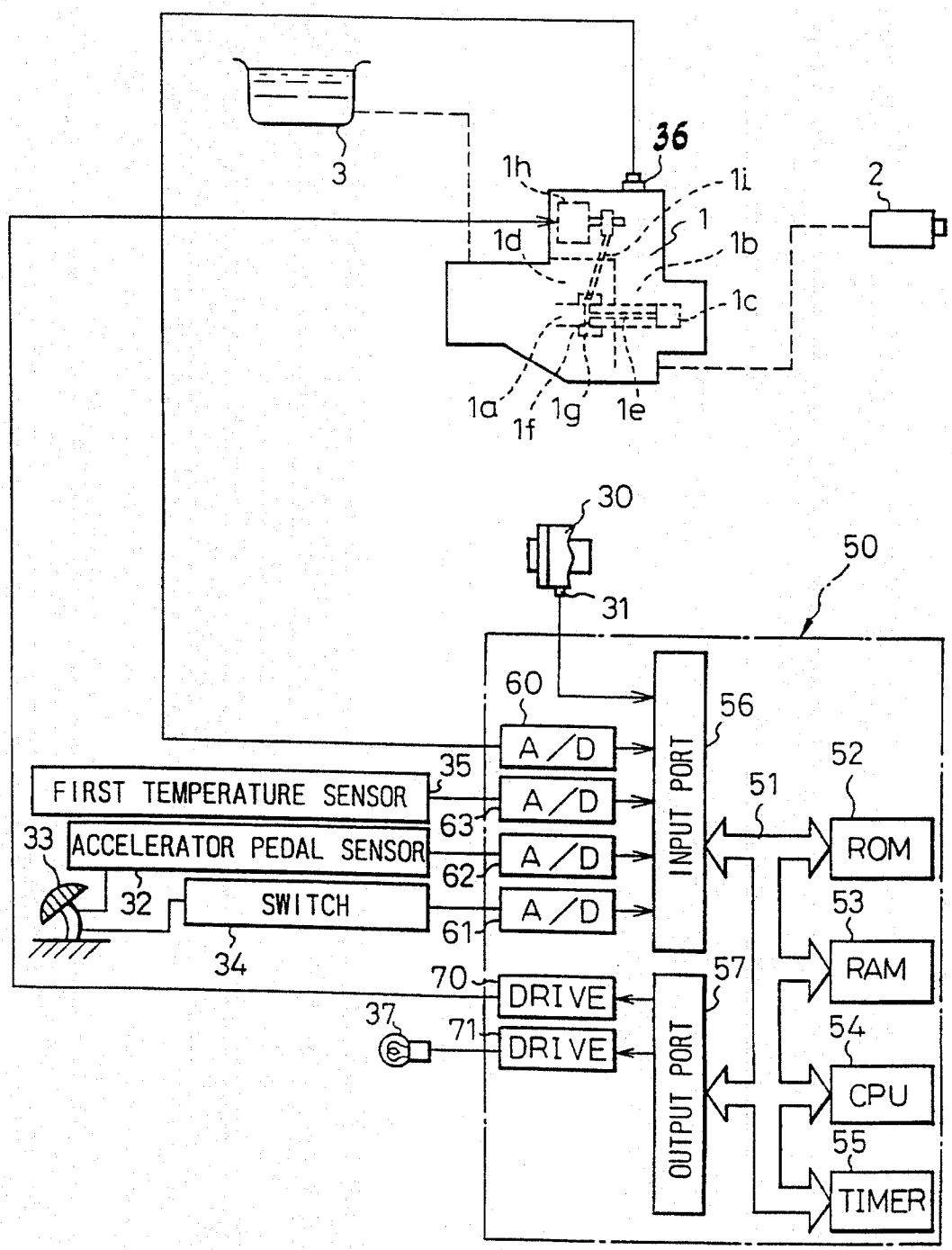
FIG. 1 is a schematic view of a fuel injection system as an embodiment of the present invention.

Referring to FIG. 1, reference numeral 1 designates a fuel injection pump, reference numeral 2 designates a fuel injection valve for injecting fuel fed by the fuel injection pump 1 into the engine cylinder, and reference numeral 3 designates a fuel tank for supplying fuel to the fuel injection pump 1. The fuel injection pump 1 is a positive displacement type and is a usual distributor-type injection pump for a diesel engine, which comprises a plunger $1a$ which is reciprocated while being rotated, so as to synchronize with the engine crankshaft, within the pump cylinder $1b$. In this fuel injection pump 1, when the volume of a compression chamber $1c$, defined by the end of the plunger $1a$ and the pump cylinder $1b$, becomes large, fuel is sucked into the compression chamber $1c$ from a pump chamber $1d$. When the volume of the compression chamber $1c$ becomes small, fuel in the compression chamber $1c$ is compressed and fed to one of the fuel injection valves 2 to supply fuel into the corresponding engine cylinder via a fuel supply passage $1e$ formed within the plunger $1a$ and one of fuel delivery passages (not shown) formed within the wall of the pump cylinder $1b$.

Such fuel transfer is carried out only when a spill passage $1f$ between the fuel supplying passage $1e$ and the outer surface of plunger $1a$ in the pump chamber $1d$ is closed by a spill ring $1g$ fitted on the outer surface of the plunger $1a$. Accordingly, the volume of fuel fed to the fuel injection valve 2 can be varied by moving the spill ring $1g$ axially on the plunger $1a$ by a step motor $1h$ via a connection mechanism $1i$ between the step motor $1h$ and the spill ring $1g$.

Reference numeral 50 designates the electronic control unit for controlling the volume of fuel fed to the fuel injection valve 2. The electronic control unit 50 is constructed as a digital computer and includes a ROM (read only memory) 52, a RAM (random access memory) 53, a CPU (microprocessor, etc.) 54, a timer 55, an input port 56, and an output port 57, which are interconnected by a bidirectional bus 51. The timer 55 is comprised of a free running counter which performs a count-up function when power is supplied to the electronic control unit 50; i.e., the count of the free running counter indicates a time. A distributor 30 is provided with a crank angle sensor 31 connected to the input port 56. An accelerator pedal sensor 32 for detecting the degree of opening of an accelerator pedal 33, a switch 34 which is on when the accelerator pedal 33 is not depressed, a first temperature sensor 35 for detecting the temperature of the engine cooling water as the engine temperature, and a second temperature sensor 36 for detecting temperature of fuel in the fuel injection pump 1, are also connected to the input port 56, via AD converters 62, 61, 63, and 60, respectively. The output port 57 is connected to the step motor 1h of the fuel injection pump 1 via a drive circuit 70. The output port 57 is also connected through a drive circuit 71 to an alarm lamp 37 for showing that low quality fuel is contained in the fuel injection pump 1.

Figure 2:
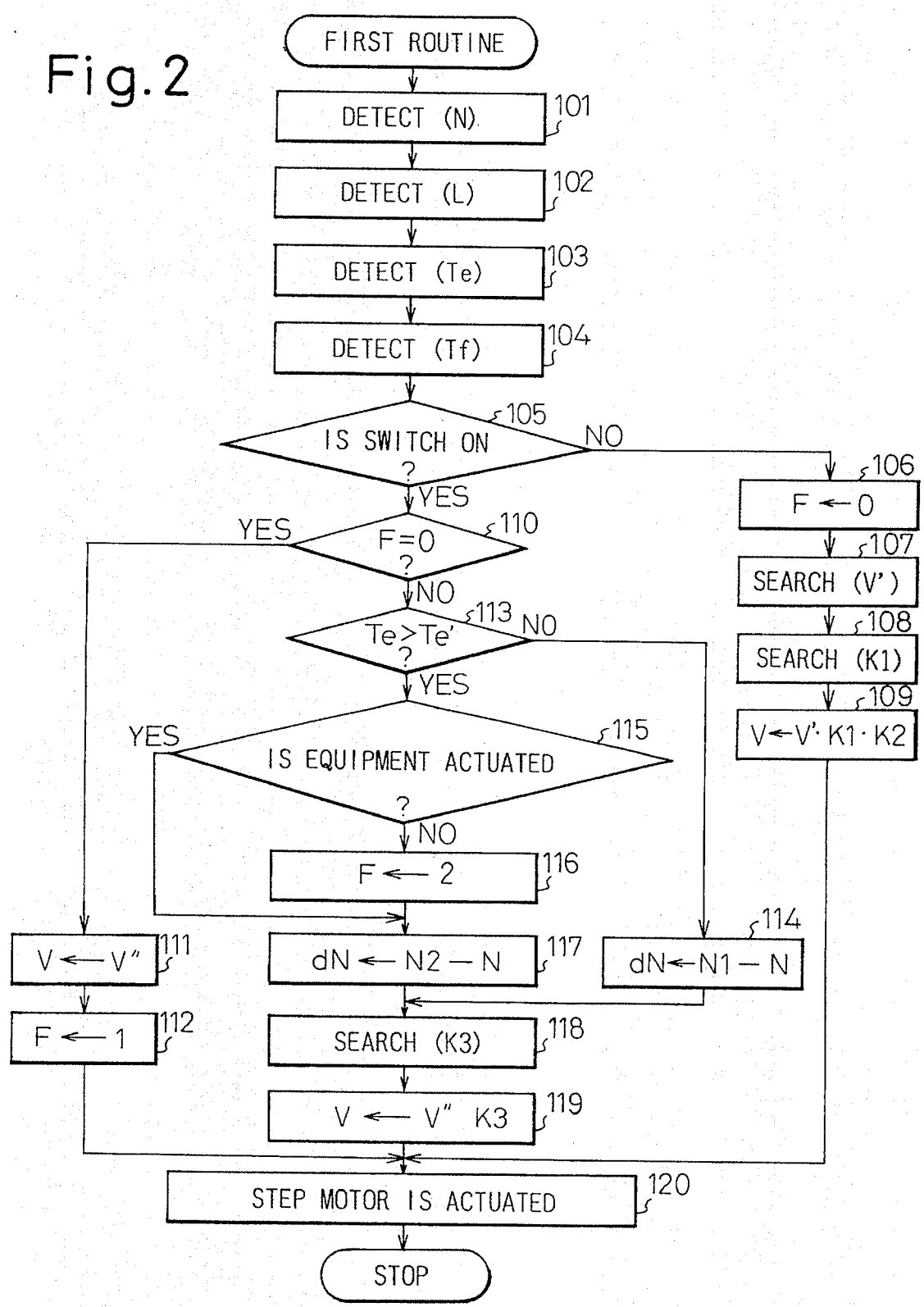
FIG. 2 is a first routine for controlling the volume of fuel injected.

The electronic control unit 50 determines the volume of fuel to be fed to the fuel injection valve 2 and actuates the spill ring via the step motor 1h, so as to realize a desired engine operating condition, according to a first routine shown in FIG. 2. Note that the first routine is executed at every fuel injection time for a certain engine cylinder.

Referring to FIG. 2, at step 101 a current engine speed (N) is detected on the basis of the signal from the crank angle sensor 31, and the routine goes to step 102.

At step 102, a current engine load (L) is detected on the basis of a signal from the accelerator pedal sensor 32, and the routine goes to step 103.

At step 103, a current engine temperature (Te) is detected on the basis of a signal from the first temperature sensor 35, and the routine goes to step 104.

At step 104, a current fuel temperature (Tf) is detected on the basis of a signal from the second temperature sensor 36, and the routine goes to step 105.

At step 105, it is determined if the switch 34 is closed. When the result is negative, i.e., the current engine operating condition is not an idle condition, the routine goes to step 106 and a flag (F) is made "0". Next, the routine goes to step 107.

Figure 3:
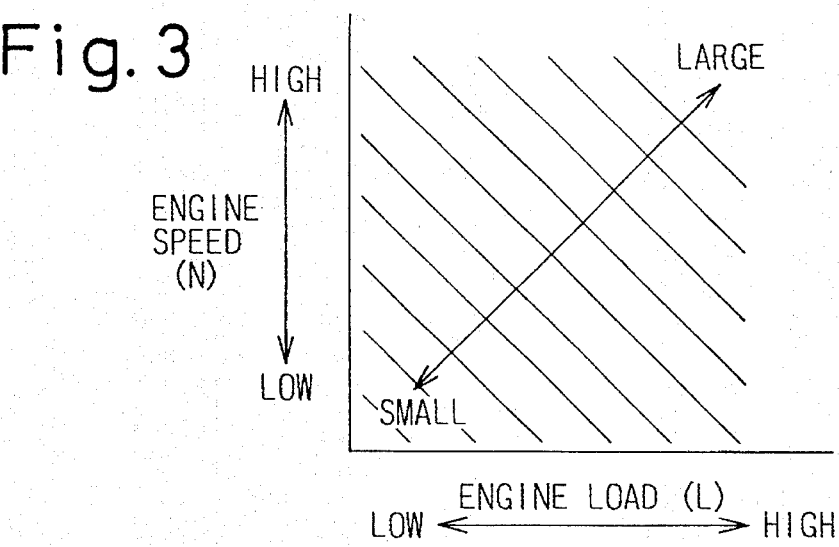
FIG. 3 is a first map for searching for a first basic volume of fuel injected, corresponding to a current engine operating condition.

At step 107, a search is made for a first basic volume (V') of fuel fed to the fuel injection valve 2, on the basis of the current engine speed (N) and load (L), and the routine goes to step 108. The search at step 107 is carried out by using the first map shown in FIG. 3.

Figure 4:
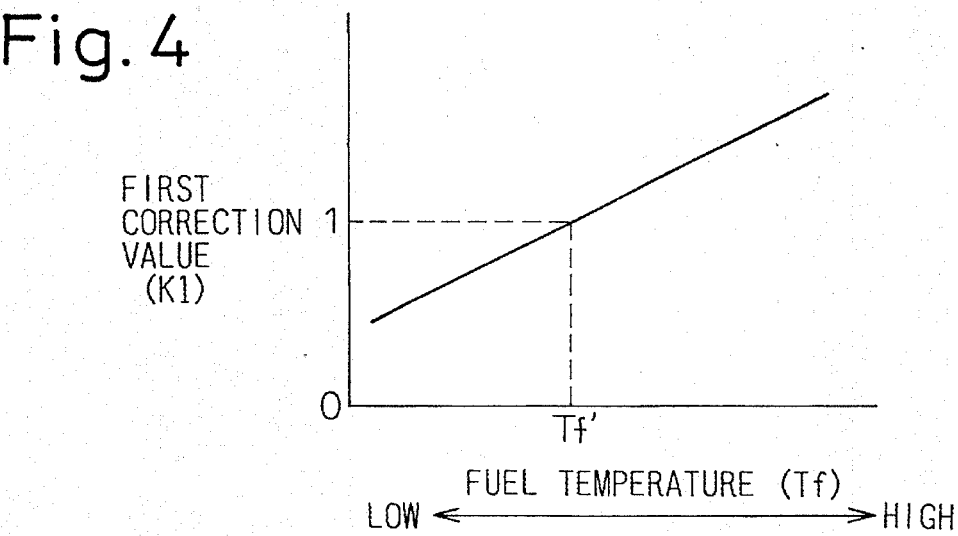
FIG. 4 is a second map for searching for a first correction value, corresponding to a current fuel temperature.

At step 108, a search is made for a first correction value (K1) for correcting the first basic volume (V') to take account of the density and the bulk modulus corresponding to fuel temperature in fuel having standard properties, on the basis of the current fuel temperature (Tf) detected at step 104, and routine goes to step 109. The search at step 108 is carried out by using the second map shown in FIG. 4. In the second map, the first correction value (K1) when the fuel temperature is a predetermined temperature (Tf) is set to "1". Accordingly, in the first map, each first basic volume (V') is set to the volume of normal fuel (having standard properties) which must be fed to the fuel injection valve 2 in each engine operating condition when the fuel is at the predetermined temperature (Tf).

At step 109, the required volume (V) of fuel is calculated by multiplying the first basic volume (V') by the first correction value K1 and by a second correction value K2 (which is explained later) and the routine goes to step 120.

On the other hand, when the result at step 105 is affirmative, the routine goes to step 110 and it is determined if the flag (F) is "0". The flag (F) is reset "0" when the engine is stopped. Accordingly, at first, the result is affirmative and the routine goes to step 111 and the required volume (V) is determined to be the second basic volume (V") of a normal fuel which must be fed to the fuel injection valve 2 in the idle operating condition when the fuel is at the predetermined temperature (Tf). Next, the routine goes to step 112 and the flag (F) is made "1". Thereafter, the routine goes to step 120.

At the next processing of the first routine, if the current engine operating condition is an idle condition, the result at step 110 is negative and the routine goes to step 113.

At step 113, it is determined if the current engine temperature (Te) is higher than a predetermined engine temperature (Te'). When the result is negative; i.e., the engine has not warmed up and is in a cold condition, the routine goes to step 114 and a difference (dN) between a first target engine speed (N1) in the cold condition and the current engine speed (N) is calculated. The first target engine speed (N1) is a constant here but may be a variable which is varied corresponding to the current engine temperature (Te). Next, the routine goes to step 118.

On the other hand, when the result at step 113 is affirmative; i.e., the engine is warmed up, the routine goes to step 115 and it is determined if vehicle equipment which causes an extra engine load, for example an air conditioner or the head-lights, is operating, for example by detecting the condition of the switch for the vehicle equipment. When the result is affirmative, the routine goes to step 117. On the other hand, when the result is negative, the routine goes to step 116 and the flag (F) is made "2", and thereafter the routine goes to step 117.

At step 117, a difference (dN) between a second target engine speed (N2) in the warm up condition and the current engine speed (N) is calculated. The above first target engine speed (N1) is set higher than the second target engine speed (N2) such that in the cold condition, the engine warm up is realized rapidly and combustion at this time becomes stable. The second target engine speed (N2) is a constant. Next, the routine goes to step 118.

Figure 5:
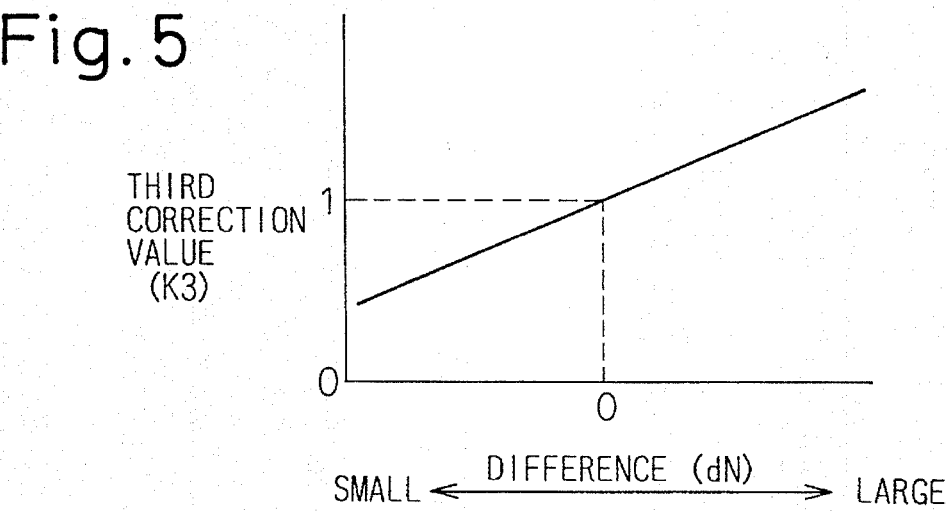
FIG. 5 is a third map for searching for a third correction value, corresponding to a difference between engine speeds.

At step 118, a search is made for a third correction value K3 for correcting the second basic volume (V") so as to realize the desired engine speed (N1 or N2), on the basis of the difference (dN) calculated at step 114 or 117, and routine goes to step 119. The search at step 118 is carried out using the third map shown in FIG. 5.

At step 119, the required volume (V) of fuel fed is calculated by multiplying the second basic volume (V") by the third correction value K3, and routine goes to step 120.

At step 120, the step motor 1h in the fuel injection pump 1 is actuated such that the required volume (V) of fuel is fed to the fuel injection valve 2.

Figure 6:
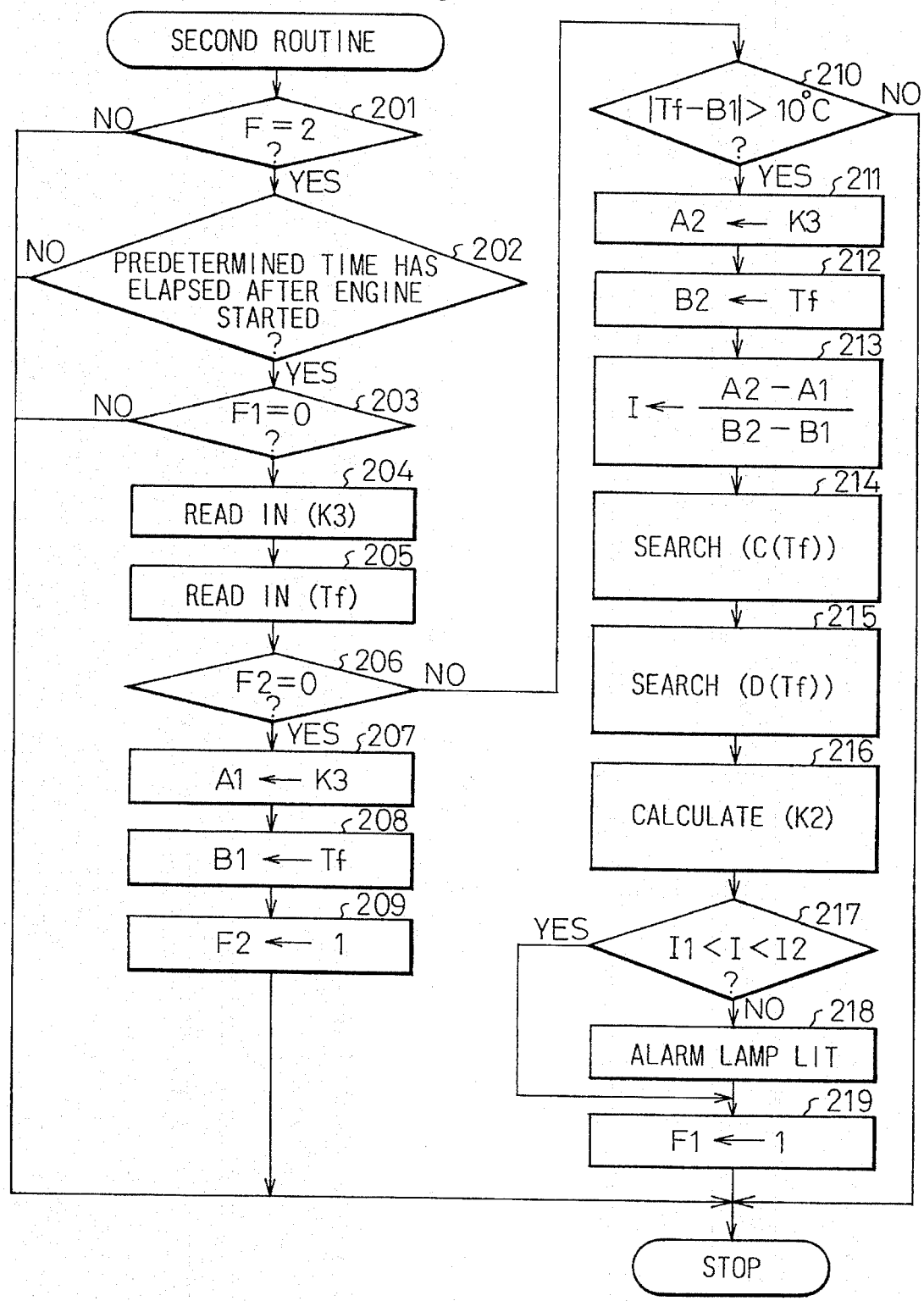
FIG. 6 is a second routine for determining a second correction value.

The electronic control unit 50 also decides the second correction value K2 used in the first routine, according to a second routine shown in FIG. 6. Note that the second routine is executed at the same time as the first routine.

Referring to FIG. 6, at step 201 it is determined if the flag (F) in the first routine is "2". When the result is negative, the routine is stopped. On the other hand, when the result is affirmative; i.e., the current engine operating condition is an idle condition, the above vehicle equipment is not operated and the correction of the second basic volume (V") of fuel is carried out, the routine goes to step 202.

At step 202, it is determined if a predetermined time has elapsed since the engine started by using the timer 55. When the result is negative, the routine is stopped. On the other hand, when the result is affirmative; i.e., the fuel which existed in the fuel injection pump 1 when the engine started is used up and the fuel from the fuel tank 3 is injected into each engine cylinder, the routine goes to step 203.

At step 203, it is determined if a first flag (F1) is "0". The first flag (F1) is reset to "0" when the engine is stopped.

Accordingly, at first, the result is affirmative and the routine goes to step 204.

At step 204, the current third correction value K3 found at step 118 of the first routine is read in and at step 205, the current fuel temperature (Tf) detected at step 104 of the first routine is read in.

Next, the routine goes to step 206 and it is determined if a second flag (F2) is "0". The second flag (F2) is reset to "0" when the engine is stopped. Accordingly, at first, the result is affirmative and the routine goes to step 207.

At step 207, the current third correction value K3 is set to (A1) and at step 208, the current fuel temperature (Tf) is set to (B1). Next, the second flag (F2) is set to "1" and the routine is stopped.

At the next processing of the second routine, if the current engine operating condition is an idle condition, if the above vehicle equipment is not actuated and if the correction of the second basic volume (V") of fuel is carried out, at step 204 and step 205, the current third correction value K3 and the current fuel temperature (Tf) are read in again.

Next, the result at step 206 is negative and the routine goes to step 210. At step 210, it is determined if an absolute value of a difference (Tf–B1) between the current fuel temperature (Tf) and the fuel temperature (B1) in the last process is larger than 10 degrees C. When the result is negative, the routine is stopped. On the other hand, when the result is affirmative, the routine goes to step 211.

At step 211, the current third correction value K3 is set to (A2) and at step 212, the current fuel temperature (Tf) is set to (B2). Next, the routine goes to step 213 and an inclination (I) of a variation (A2– A1) between the current third correction value (A2) and the last third correction value (A1) against a variation (B2–B1) between the current fuel temperature (B2) and the last fuel temperature (B1) is calculated.

The inclination (I) is calculated on the basis of two required correction values for correcting the constant volume of fuel fed to the fuel injection valve at two fuel temperatures to realize the same target engine speed under the same engine load. The inclination (I) depends on all the properties of a fuel which vary corresponding to the fuel temperature and which affect the weight of the fuel fed to the fuel injection valve.

The density, the bulk modulus, and the coefficient of viscosity which affects an inside leak amount of fuel in the fuel injection pump 1 come under the above properties of fuel. In the embodiment, two correction values in an idle condition are used in the calculation of the inclination (I). The volume of fuel fed to the fuel injection valve at this time is relatively small so that a density variation corresponding to fuel temperature hardly affect the third correction value variation (B2–B1). Thus, it can be considered that the inclination (I) shows the variations corresponding to fuel temperature, of the bulk modulus and the coefficient of viscosity of the fuel in the fuel tank 3.

Next, the second routine passes to step 218 from step 214 and the second correction value K2 used in step 109 of the first routine is calculated. Thereafter, the routine goes to step 219 and the first flag (F1) is made "1" and the routine is stopped. Accordingly, at next process, the result of step 203 remains negative until the engine is stopped, so that a new inclination (I) is calculated every the engine starts.

When the engine is operating, fuel is not usually refueled so that the change of properties of fuel injected caused by refueling usually occures when the engine is stopped. Of course, whether a fuel having the same properties is refueled or a fuel is not refueled when the engine is stopped, a new inclination (I) calculated is the same as the last inclination so that a new second correction value K2 calculated is the same as the last second correction value. However, when fuel having different properties is refueled, the new inclination (I) is different from the last inclination.

Figure 7:
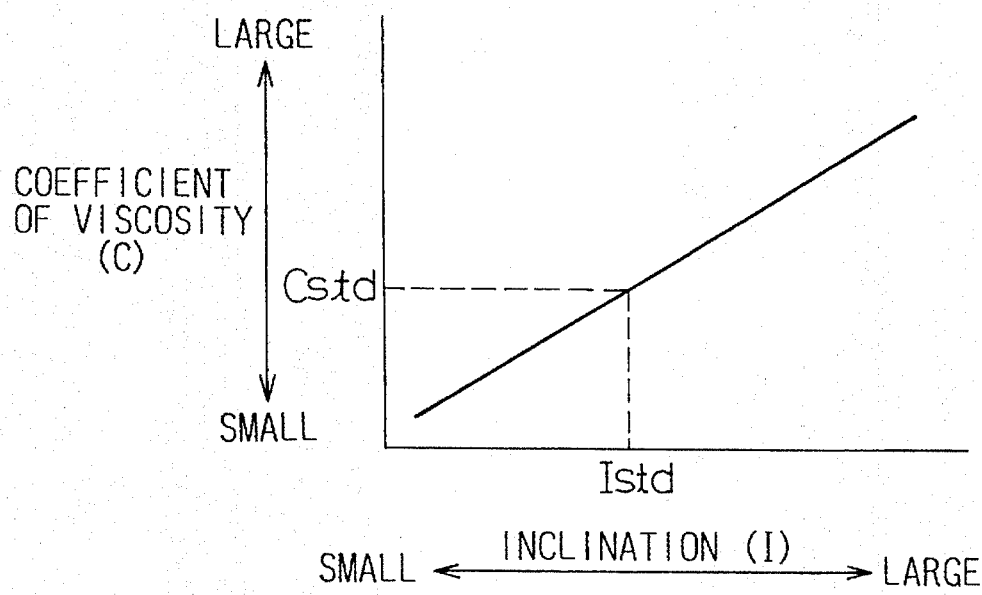
FIG. 7 is one map in a first group for searching for coefficient of viscosity in current fuel.

The variations corresponding to fuel temperature of the bulk moduli of all fuels sold in a market are about the same. Accordingly, if the new inclination (I) is different from the old inclination in the embodiment, the difference between them is caused by the difference between coefficients of viscosity in each fuel. Thus, at step 214, the coefficient of viscosity (C(Tf)) at each fuel temperature (Tf) for the current fuel can be determined on the basis of the inclination (I). The determination is carried out using a first group of maps. FIG. 7 shows one map of the first group. In the map, the relationship between the inclinations (I) and the coefficients of viscosity (C) at a certain fuel temperature is shown. If current fuel is normal, the inclination (I) calculated becomes a standard inclination (Istd) and the coefficient of viscosity (C) becomes a standard coefficient of viscosity (Cstd). The first group has a map for each fuel temperature and each map is similar to the above map.

Figure 8:
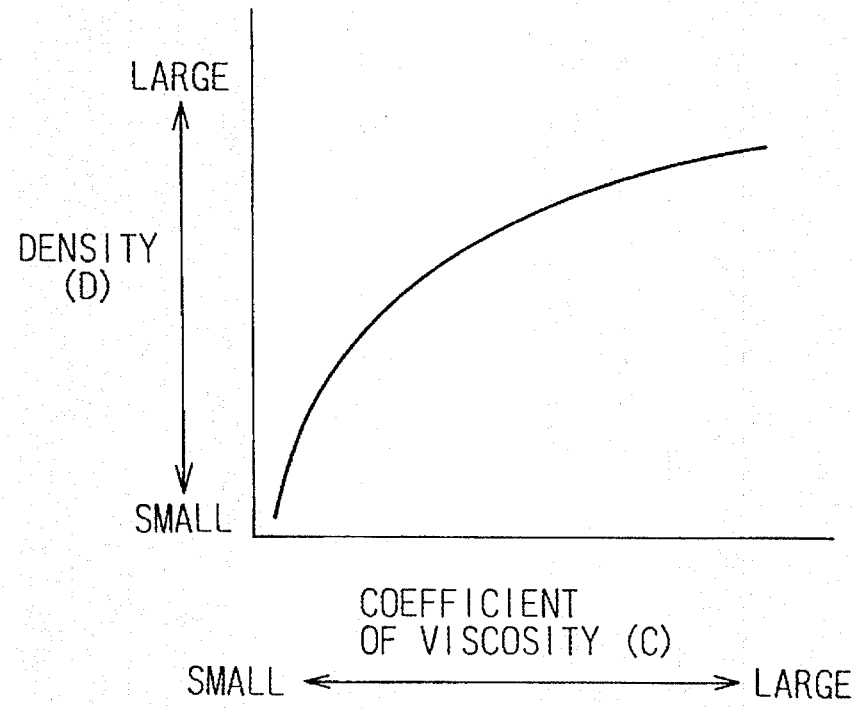
FIG. 8 is one map in a second group for searching for density in current fuel.

A certain relationship between the density (D) and the coefficients of viscosity (C) is known so that at step 215 in the routine, the density (D(Tf)) at each temperature of the current fuel is determined on the basis of coefficients of viscosity (C(Tf)) at each fuel temperature found at step 214. The determination is carried out using a second group of maps. FIG. 8 shows one map of the second group. In the map, the relationship between the coefficients of viscosity (C) and the density (D) at certain fuel temperatures is shown.

The second correction value K2 used in the first routine corrects the volume of fuel fed to the fuel injection valve 2 in engine operating conditions other than the idle condition. Accordingly, the engine speed in these engine operating conditions is relatively high so that the plunger 1a in the fuel injection pump 1 is reciprocated and rotated rapidly and thus the inside leak amount of fuel affected largely by the coefficient of viscosity is small. On the other hand, the required weight of fuel injected becomes relatively large so that the density of the fuel greatly affects the weight of fuel injected.

Accordingly, at step 216 of the second routine, the ratio (D/Dstd(Tf)) the density (D(Tf)) of the current fuel compared to a standard density (Dstd(Tf)) at each fuel temperature (Tf) are calculated, and the ratio (D/Dstd(Tf)) becomes the second correction value (K2(Tf)) and is used at step 109 of the first routine. Thus, according to the embodiment, when the properties of the fuel are changed after refueling, the required weight of fuel can be injected to the engine cylinder in each engine operating condition.

Next, the routine goes to step 217 and it is determined if the inclination (I) calculated at step 213 is smaller than an upper limit value (I2) and is larger than a lower limit value (I1). When the result is negative; i.e., the fuel tank 3 is refilled with a fuel which has properties which are very different from standard properties, the routine goes to step 218 and the alarm lamp 37 is lit, and thus a driver can know that the fuel tank 3 has been refilled with an incorrect fuel.

In the second routine, when the result at step 210 is negative, a difference between two third correction values (A1) and (A2) becomes very small and thus a precise inclination (I) in the current fuel can not be calculated so that the routine is stopped. The method of least squares may be used in the calculation of an inclination (I). Moreover, a new inclination (I) may be calculated only when the vehicle actually is refueled.

Of course, the volume of the fuel fed to the fuel injection valve may be corrected on the basis of coefficients of viscosity, at each fuel temperature, for the current fuel. Moreover, the volume of fuel fed to the fuel injection valve may be corrected on the basis of coefficients of viscosity and density, at each fuel temperature, for the current fuel.

Although the invention has been described with reference to specific embodiments thereof, it should be apparent that numerous modifications can be made thereto by those skilled in the art, without departing from the basic concept and scope of the invention.

We claim:

1. A method for controlling a fuel injection system having a fuel injection pump, comprising the steps of:
    a) correcting a first basic volume of fuel fed by said fuel injection pump by using a correction value calculated to achieve a predetermined constant engine speed during at least one predetermined engine operating condition;
    b) calculating a variation in said correction value corresponding to a fuel temperature at a predetermined engine load in said at least one predetermined engine operating condition;
    c) determining at least one property of a current fuel based on said variation; and
    d) controlling the fuel injection system based on said at least one property.

2. The method according to claim 1, wherein said predetermined engine operating condition comprises an idle condition in which fuel increasing is not performed deliberately, and said at least one property comprises a coefficient of viscosity, said method further comprising the step of:
    e) correcting a second basic volume of fuel fed by said fuel injection pump based on said coefficient of viscosity of the current fuel during engine operating conditions other than said predetermined engine operating condition.

3. The method according to claim 1, wherein said predetermined engine operating condition comprises an idle condition in which fuel increasing is not performed deliberately, and said property comprises a coefficient of viscosity, said method further comprising the steps of:
    e) determining a density of the current fuel based on said coefficient of viscosity; and
    f) correcting a second basic volume of fuel fed by said fuel injection pump based on said density during engine operating conditions other than said predetermined engine operating condition.

4. The method according to claim 1, further comprising the step of:
    e) indicating that an incorrect fuel is being resupplied based on said property of the current fuel determined in step c).

5. The method according to claim 1, wherein said step b) of calculating the variation further comprises calculating the variation as an inclination by using two correction values at two fuel temperatures.

6. The method according to claim 1, further comprising the step of:
    e) performing said step b) of calculating the variation at least after every refueling.

7. A fuel injection system comprising:
    a) a fuel injection pump;
    b) a plurality of sensors for detecting an engine load, an engine operating condition, a fuel temperature, and an engine speed;
    c) an electronic control unit, including a processor being coupled to the fuel injection pump and said plurality of sensors, said processor being programmed to perform a series of calculation and signal handling steps for controlling the fuel injection pump, said calculation and signal handling steps comprising:
        (1) correcting a first basic volume of fuel fed by said fuel injection pump by using a correction value calculated so as to achieve a predetermined constant engine speed during at least one predetermined engine operating condition;
        (2) calculating a variation in said correction value corresponding to a fuel temperature at a predetermined engine load in said at least one predetermined engine operating condition;
        (3) determining at least one property of a current fuel based on said variation; and
        (4) controlling said fuel injection pump based on said at least one property determined in step (3).

8. The fuel injection system according to claim 7, wherein said predetermined engine operating condition comprises an idle condition in which fuel increasing is not carried out deliberately, and said at least one property comprises a coefficient of viscosity, said calculation and signal handling steps further comprising:
    (5) correcting a second basic volume of fuel fed by said fuel injection pump based on said coefficient of viscosity of the current fuel during engine operating conditions other than said predetermined engine operating condition.

9. The fuel injection system according to claim 7, wherein said predetermined engine operating condition comprises an idle condition in which fuel increasing is not carried out deliberately, and said property comprises a coefficient of viscosity, said calculation and signal handling steps further comprising:
    (5) determining a density of the current fuel based on said coefficient of viscosity; and
    (6) correcting a second basic volume of fuel fed by said fuel injection pump based on said density during engine operating conditions other than said predetermined engine operating condition.

10. The fuel injection system according to claim 7, wherein said calculation and signal handling steps further comprise:
    (5) indicating that an incorrect fuel is being resupplied based on said property of the current fuel determined in step (3).

11. A fuel injection system according to claim 7, wherein said calculation and signal handling step (2) further comprises calculating said variation in said correction value as an inclination by using two correction values at two fuel temperatures.

12. The fuel injection system according to claim 7, wherein said calculation and signal handling steps further comprise:
    (5) calculating said variation in said step (2) at least after every refueling.

* * * * *